United States Patent
Bauer et al.

(10) Patent No.: US 8,573,267 B2
(45) Date of Patent: Nov. 5, 2013

(54) METHOD AND DEVICE FOR CONTAMINATION-FREE TRANSPORT OF POURABLE BULK PRODUCT

(75) Inventors: Helmuth Bauer, Buchen (DE); Christian Leist, Osterburken (DE)

(73) Assignee: AZO Holding GmbH, Osterburken (DE)

(*) Notice: Subject to any disclaimer, the term of this patent is extended or adjusted under 35 U.S.C. 154(b) by 0 days.

(21) Appl. No.: 13/455,231

(22) Filed: Apr. 25, 2012

(65) Prior Publication Data
US 2012/0204999 A1    Aug. 16, 2012

Related U.S. Application Data

(63) Continuation of application No. 12/385,564, filed on Apr. 13, 2009, now abandoned.

(30) Foreign Application Priority Data

Apr. 22, 2008  (DE) .......................... 10 2008 020 218

(51) Int. Cl.
*B65B 1/04*    (2006.01)
(52) U.S. Cl.
USPC ............... 141/83; 141/5; 141/346; 141/372
(58) Field of Classification Search
USPC ............... 141/1, 4–6, 9, 83, 346–349, 361, 141/368–372
See application file for complete search history.

(56) References Cited

U.S. PATENT DOCUMENTS

| | | | |
|---|---|---|---|
| 2,811,178 A * | 10/1957 | Cunningham | 141/6 |
| 4,182,383 A * | 1/1980 | Adomitis et al. | 141/5 |
| 4,212,331 A * | 7/1980 | Benatar | 141/67 |
| 4,854,353 A * | 8/1989 | Russell | 141/74 |
| 5,052,451 A * | 10/1991 | Gentilcore et al. | 141/67 |
| 5,263,521 A * | 11/1993 | Brossard et al. | 141/384 |
| 5,738,153 A * | 4/1998 | Gerling et al. | 141/83 |
| 6,170,718 B1 * | 1/2001 | Ziegler et al. | 222/450 |
| 6,688,496 B1 * | 2/2004 | Ahlmer et al. | 222/153.09 |
| 6,823,904 B2 * | 11/2004 | Finke et al. | 141/61 |
| 7,128,107 B2 * | 10/2006 | Baumann | 141/350 |
| 7,175,048 B2 * | 2/2007 | Wolfschaffner | 222/77 |
| 2002/0134796 A1 * | 9/2002 | Nussbaumer | 222/200 |
| 2004/0007285 A1 * | 1/2004 | Finke et al. | 141/83 |
| 2005/0145420 A1 * | 7/2005 | Wolfschaffner | 177/116 |
| 2006/0225808 A1 * | 10/2006 | Baumann | 141/83 |
| 2011/0214780 A1 * | 9/2011 | Pahl et al. | 141/99 |

* cited by examiner

*Primary Examiner* — Gregory Huson
*Assistant Examiner* — Nicolas A Arnett
(74) *Attorney, Agent, or Firm* — Paul Vincent

(57) ABSTRACT

A method for substantially contamination-free transport of pourable bulk product from a dosing unit into a container is proposed, wherein the dosing outlet of the dosing unit is connected in a detachable manner with the receiving inlet of the container, the dosing outlet and the receiving inlet are opened, and the bulk product is transported into the container from the dosing unit via its dosing outlet and via the receiving inlet of the container. The receiving inlet of the container is disposed at the dosing unit by means of an elastic joining element to prevent transfer of forces between the dosing unit and the container during the dosing process. A device for carrying out such a method is also proposed.

16 Claims, 4 Drawing Sheets

METHOD AND DEVICE FOR CONTAMINATION-FREE TRANSPORT OF POURABLE BULK PRODUCT

This application is a continuation in part of Ser. No. 12/385,564 filed Apr. 13, 2009 now abandoned and claiming Paris convention priority of DE 10 2008 0202 18.5 filed Apr. 22, 2008, the entire disclosures of which are hereby incorporated by reference.

BACKGROUND OF THE INVENTION

The invention concerns a method for substantially contamination-free transport of pourable bulk product from a dosing unit with a lidded dosing outlet into a container with a lidded receiving inlet, wherein the dosing outlet of the dosing unit is connected with the receiving inlet of the container in a detachable manner, the dosing outlet and the receiving inlet are opened and the bulk product is transported from the dosing unit to the container via the dosing outlet of the dosing unit and the receiving inlet of the container. The invention further concerns a device suitable for using such a method for substantially contamination-free transport of pourable bulk product, having a dosing unit with a lidded dosing outlet and having a container with a lidded receiving inlet, wherein the dosing outlet of the dosing unit is connected with the receiving inlet of the container in a detachable manner. Finally, the invention concerns a facility for substantially contamination-free, gravimetric combining of individual bulk product components from several reservoirs, each having a dosing unit with a lidded dosing outlet, into a container having a lidded receiving inlet, wherein a weighing device is associated with each reservoir which acts in combination with the container at least while bulk product is being dosed coming from the respective reservoir, wherein the container travels below the dosing units of the reservoirs and can be sequentially connected, in a detachable manner, to the dosing unit of the respective reservoir according to the desired mixture ratio.

When dosing fluid or pourable, primarily particulate bulk products, in particular when producing mixtures of different bulk products of such kind according to a desired mixture ratio, it is often desired that the respective bulk product does not come into contact with the surroundings during the dosing process to avoid contamination of the bulk product from the outside, but also—for example if bulk products are harmful to the health—to reliably prevent contamination of the surroundings. This applies particularly to products with increased hygiene and purity requirements, such as foodstuff, pharmaceuticals and the like. Furthermore, it must be ensured when producing mixtures of such—different—bulk products, which are, for example, stored in separate reservoirs and are to be fed to a mixing tank according to the desired recipe, that neither the dosing outlet of the respective dosing unit (for example the dosing unit of each reservoir) nor the receiving inlet of the container in which the bulk product components are to be combined are contaminated with foreign bulk product.

It is known to close each dosing outlet and/or receiving inlet by means of a slider to prevent contamination of the bulk product while the dosing unit is transported to the container as well as contamination of the surroundings with the bulk product. However, this necessitates frequent cleaning of such sliders if it must be ensured that residues of bulk products which cling to the sliders are not spread. Apart from this mechanism, further different closing mechanisms of the dosing outlets and/or receiving inlets are known, for example in the form of divisible shutters (EP 1 315 662 A1) or more or less conical plugs (EP 0 968 937 A1). One disadvantage of such closing mechanisms is the various substantial difficulties associated with their complex structure. This applies particularly to the closing shutters in accordance with the above-mentioned EP 1 315 662 A1. Another disadvantage consists in the fact that such closing mechanisms, such as the plugs in accordance with the above-mentioned EP 0 968 937 A1, are bound to result in sealing forces being transferred between the dosing unit and the container to be filled, so that gravimetric dosing, and in particular gravimetric measuring, of the bulk product poured into the container during the dosing process becomes very difficult or substantially impossible.

DE 603 10 369 T2 discloses a device for preferably contamination-free transport of bulk product from an upper container equipped with a dosing mechanism into a container disposed below it, wherein the upper container can be docked to the lower container. Gravimetric dosing, and in particular gravimetric measuring, of the bulk product poured into the lower container during the dosing process is also not possible in the device known from this publication. The same applies to a similar device according to EP 0 547 861 A1 and a device known from DE 295 03 812 U1 for preferably contamination-free transport of bulk product, whose dosing mechanism can be connected with the inlet of a receptacle by means of a collar.

DE 10 2005 014 930 A1 discloses a facility for gravimetric combining of individual bulk product components from several reservoirs, each with one respective dosing unit, into a transport container which travels between the reservoirs and receives the bulk product components from the respective reservoir according to the desired recipe. Each dosed amount of bulk product is gravimetrically measured by means of several weighing devices in the form of container scales disposed below the respective reservoir, onto which the transport container is placed by means of a lifting device. During the dosing process, the transport container, which rests on the weighing device, is lifted by means of the lifting devices of the weighing device to a level where its receiving inlet can be connected to the dosing outlet of the reservoir disposed above it, whereupon the bulk product component to be dosed is poured until the weighing device detects the desired weight. The container is subsequently lowered again, wherein its receiving inlet is decoupled from the dosing outlet, and the container is transported on to the next reservoir or towards an evacuation station.

Although this procedure has proven its worth in practice, the lifting devices of the weighing devices used, which have to shift the entire container between an upper docking position to the dosing unit of each reservoir and a lower transport position, cause considerable costs, which, for reasons of size, are higher the larger and heavier the container is configured.

The invention is based on the task of further developing a method and device of the above-mentioned kind while preferably avoiding the above-mentioned disadvantages in such a way that substantially contamination-free transport of the bulk product from the dosing unit to the container is possible while the amount of the bulk product dosed in each case is gravimetrically measured, wherein the transport can be carried out both using a simpler construction and in a more cost-effective manner than in prior art.

SUMMARY OF THE INVENTION

As regards the method, this task is solved in a method of the above-mentioned kind by ensuring that the dosing outlet of the dosing unit is disposed at the dosing unit by means of an elastic joining element to avoid transfer of forces between the dosing outlet and the dosing unit, and/or the receiving inlet of the container is disposed at the container by means of an elastic joining element to avoid transfer of forces between the receiving inlet and the container, wherein the dosing outlet/receiving inlet connected with each other are disposed in such a way relative to the dosing unit and/or the container that a transfer of forces between the dosing unit and the container is prevented by the elastic joining element.

As regards the device, the invention further envisions a device of the above-mentioned kind in such a way that the dosing outlet of the dosing unit is disposed at the dosing unit by means of an elastic joining element to prevent transfer of forces between the dosing outlet and the dosing unit, and/or the receiving inlet of the container is disposed at the container by means of an elastic joining element to prevent transfer of forces between the receiving inlet and the container, wherein the dosing outlet and the receiving inlet, which are connected with each other, can be disposed in such a position relative to the dosing unit and/or the container that a transfer of forces can be prevented by the elastic joining element.

The invention makes it possible that the process of joining the dosing unit and the container—or rather: the dosing outlet and the receiving inlet—, also referred to as "docking", does not bring about a transfer of forces between the dosing unit and the container, in particular forces with a vertically effective component i.e. an effective component in the direction of the gravitational force, since, due to its elasticity, the elastic joining element cannot transfer such forces if it has been brought into such a position relative to the dosing unit and/or the container that it exclusively joins the dosing outlet and the dosing unit and/or the receiving inlet and the container in the dosing position. In this manner, it is possible to gravimetrically measure the amount of dosed bulk product in a simple manner by weighing the container, which can in particular also be done continuously during the dosing process. At the same time, the elastic joining element, which may, for example, be produced in the form of circular or spiral corrugated bellows made of metal, plastic, etc., of a hose made of foil, textile or the like, and which is substantially configured, for example, in the form of a surface area of a cylinder, a truncated cone or a truncated pyramid, prevents any contact of the bulk product with the surroundings. Within the context of the current disclosure, "substantially contamination-free" means a reduced risk of contamination of both the surroundings by the dosed substances and the dosed substances themselves by influences from the surroundings compared with open dosing without docking of the dosing outlet of a dosing unit to a receiving inlet of a receptacle. The expert will be aware that 100% freedom from contamination is in practice generally only possible to a limited extent, depending on the nature of the dosed substances.

A preferred embodiment of a method in accordance with the invention envisions that the dosing outlet is disposed on a carrier which can be shifted substantially perpendicular to the dosing outlet and the carrier is connected with the dosing unit via the elastic joining element, and/or the receiving inlet is disposed on a carrier which can be shifted substantially perpendicular to the receiving inlet and the carrier is connected with the container via the elastic joining element, wherein the carrier is placed in a position relative to the dosing unit and/or the container, at least during the dosing process, in which the carrier is in contact with the dosing unit and/or the container exclusively via the elastic joining element. Consequently, such a device is characterized in that the dosing outlet is disposed on a carrier which can be shifted substantially perpendicular to the dosing outlet and the carrier is connected with the dosing unit via the elastic joining element and/or the receiving inlet is disposed on a carrier which can be shifted substantially perpendicular to the receiving inlet and the carrier is connected with the container via the elastic joining element, wherein the carrier can be placed in a position relative to the dosing unit and/or the container in which the carrier is in contact with the dosing unit and/or the container exclusively via the elastic joining element. In this manner, the carrier with the dosing outlet/receiving inlet can, for example, be in contact with the dosing unit/the container in a resting position, for example by resting on it, being engaged with it in a detachable manner, etc., wherein it is disposed away from the dosing unit/the container during the dosing process, so that the carrier and the dosing unit/the container have no contact with each other than via the elastic joining element.

In order to simplify the structure of the device, it may be expedient for only either the receiving inlet of the container or the dosing outlet of the dosing unit to be disposed at the container or the dosing unit by means of the elastic joining element, while the dosing outlet or the receiving inlet is firmly disposed at the dosing unit or the container. If dosing takes place under the influence of gravity, i.e. if the dosing unit is disposed above the container and the bulk product falls into the container from there, it has further proven favorable if the receiving inlet of the container is disposed at the container via the elastic joining element, so that it is possible, for example, that the carrier rests on the container with the receiving inlet connected with the container via the elastic joining element and that it can be lifted, as needed, to a level where the carrier is in contact with the receiving inlet exclusively via the elastic joining element.

According to a preferred embodiment of the method in accordance with the invention, it may be envisioned that the dosing outlet and the receiving inlet are opened together, wherein in particular a closing mechanism of the dosing outlet is coupled with a closing mechanism of the receiving inlet and the closing mechanisms can be placed in an opened position together. Consequently, a closing mechanism of the dosing outlet of the device in accordance with the invention can in this case be coupled with a closing mechanism of the receiving inlet, wherein the closing mechanisms can be placed in an opened position together—in particular after coupling them—to ensure that the bulk product can pass through on its way from the dosing unit to the container. The closing mechanisms may preferably be configured essentially in the form of stamps which can be shifted perpendicular to the receiving inlet and/or the dosing outlet, wherein their outer surfaces, which can be coupled with each other, are substantially congruent to prevent any clinging of bulk product to them.

In a further embodiment of the method according to the invention, pressure compensation between the interior of the dosing unit and/or the container and the surroundings is created at least during the dosing process, thereby obviating the need for aspiration airflow as generated in prior art, usually by creating an inner underpressure relative to the surroundings, for example by actively vacuuming air, to prevent fine bulk product particles from emerging through a gap formed between dosing unit and container. Such creation of underpressure, which is unnecessary in accordance with the invention, since the dosing unit and the container are connected in a dustproof manner, can lead to a vacuuming of considerable amounts of fine bulk product particles and thus to a loss of product and furthermore requires additional energy and cleaning. Such pressure compensation may, for example, be produced by means of a filter element, wherein, in particular, an elastic joining element can be used, at least part of which is made of filter material, such as filter tissue or the like. Consequently, a favorable embodiment may envision that the device further comprises a pressure compensation element configured to compensate pressure between the interior of the dosing unit and/or the container and the surroundings, wherein the pressure compensation element may in particular consist of a filter element. While such a pressure compensation or filter element may also, of course, be disposed directly at the container and/or the dosing unit, preferably in the region of the respective receiving inlet and/or dosing outlet, for example in the form of a casing recess fitted with the pressure compensation or filter element and/or an outlet to the surroundings equipped with a valve, the pressure compensation element itself may, in particular, be formed by the elastic joining element, at least part of which is made of filter material.

As mentioned above, the invention provides the simple option that the container is weighed during the dosing process, wherein the dosing outlet and/or the receiving inlet is/are closed—in particular automatically—after the desired amount of bulk product has been gravinnetrically measured and dosed. Consequently, the container can be associated with a weighing device, and, furthermore, a control system can preferably be provided which is configured to close the dosing outlet and/or the receiving inlet after a presettable amount of bulk product has been gravinnetrically measured by the weighing device and dosed.

The invention finally concerns a facility equipped with at least one such device for substantially contamination-free, gravimetric combining of individual bulk product components from several reservoirs, each having a dosing unit with a lidded dosing outlet, into a container with a lidded receiving inlet, wherein each reservoir is associated with a weighing device which acts in combination with the container at least while bulk product is dosed from the respective reservoir, wherein the container travels below the dosing units of the reservoirs and can be sequentially connected in a detachable manner with the dosing unit of the respective reservoir according to the desired mixture ratio. Such a facility may substantially be configured analogously to the facility as disclosed in the above-mentioned DE 10 2005 014 930 A1, wherein, for example, the bulk products located in the various reservoirs are weighed into the container pursuant to defined recipes.

Further advantages and features of the invention will become apparent in the following description of an embodiment and by reference to the drawings.

DESCRIPTION OF THE PREFERRED EMBODIMENT

Figure 1:
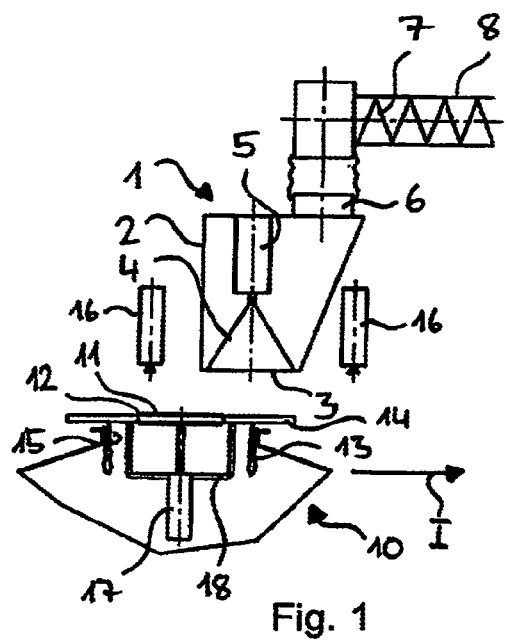
FIGS. 1 to 11 each show a schematic cross-section of an embodiment of a device in accordance with the invention in different stages of a dosing process.
Figure 2:
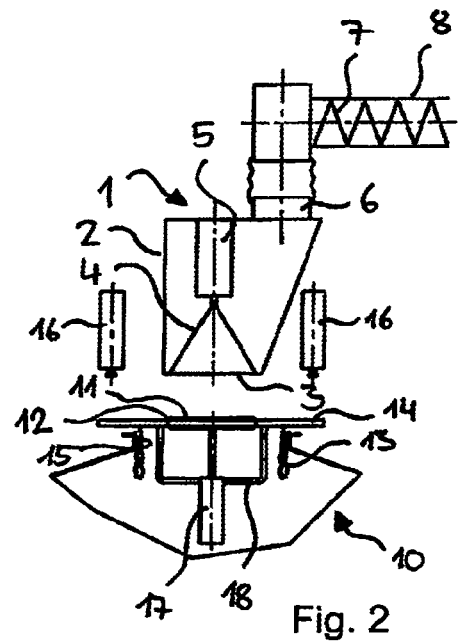

As can be seen in the drawings, a device for substantially contamination-free transport of pourable bulk product, such as powdery or particulate components for the food or pharmaceutical industries, comprises a dosing unit 1 which has a casing 2 with a dosing outlet 3 disposed on its bottom side. The dosing outlet 3 can be opened and closed by means of a closing mechanism 4, wherein the closing mechanism 4 of the dosing unit 1 is formed in the present embodiment by an approximately cone-shaped stamp which can be shifted—in this case vertically—between its (upper) closed position (cf., for example, FIG. 1) and its (lower) opened position (cf., for example, FIG. 5) by means of a piston/cylinder unit 5 fixed to the upper region of the casing 2. The piston/cylinder unit 5 may be moved hydraulically, pneumatically or hydro-pneumatically, for example, wherein, of course, any kind of driving means, such as a linear driving mechanism or the like, may also be envisioned for the closing mechanism 4. On the top side of the casing 2 is an adjacent connection 6 to a dosing mechanism 7, for example in the form of a worm conveyor, whose tubular casing 8 opens into a reservoir (not shown) which serves to store the bulk product to be dosed. The conical shape of the closing mechanism 4, which tapers upwardly towards the connection 6, and the configuration of the casing 2, with the dosing outlet 3 substantially extending across the entire bottom side of the casing 2, serve in particular to avoid dead volumes during the dosing process (FIG. 6). For the same reason, the right side wall of the casing 2 of the dosing unit 1 as shown in the drawings is slanted below the connection 6.

The device further comprises a container 10, structured and disposed to accommodate bulk product transported by means of the dosing unit 1, wherein the container 10 is equipped with a receiving inlet 12 on its upper side facing the dosing unit 1 which can be opened and closed by means of a closing mechanism 11 and can be connected in a detachable manner with the dosing outlet 3 of the dosing unit 1 as needed to transport bulk product into the container 10 by means of the dosing unit 1. The receiving inlet 12 of the container 10 is disposed at the container 10 by means of an elastic joining element 13, in this case disposed approximately as a hose, which is achieved in the embodiment shown by disposing the receiving inlet 12 on a carrier 14, which is configured as a substantially flat lid connected with the container 10 via the elastic joining element 13. The end of the joining element 13 is fixed to the bottom side of the carrier 14 facing the container 10 while enclosing, and in particular sealing, the receiving inlet 12. The other end of the joining element 13 is fixed, in particular also in a sealing manner, around an upper inlet 15 of the container 10 facing the dosing unit 1. The carrier 14 can be shifted relative to the container 10 in such a position that the carrier 14 with the receiving inlet 12 is in contact with the container 10—or rather: its inlet 15—exclusively via the elastic joining element 13, at least in a situation as shown in FIGS. 4 to 8, where the dosing outlet 3 is connected with the receiving inlet 12, i.e. the container 10 is "docked" to the dosing unit 1, to prevent transfer of forces between the dosing outlet 3 of the dosing unit 1 and the receiving inlet 12 of the container 10. A force bypass between the dosing unit 1 and the container 10 can thereby be easily prevented at least during the dosing process and in particular while the container 10 is being docked to the dosing unit 1. For this purpose, the carrier 14 with the receiving inlet 12 can be shifted—in this case vertically—in the embodiment shown between a position shown in FIGS. 1 to 3 and 9 to 11, where it rests upon the inlet 15 of the container 10 and where the inlet 15 is in alignment with the receiving inlet 12, and a position shown in FIGS. 4 to 8, where the carrier 14 with the receiving inlet 12 has been lifted respectively higher relative to the container 10. The present embodiment envisions two piston/cylinder units 16 disposed, for example, at the dosing unit 1 which can be applied on the top side of the carrier 14 when the container 10 is in its dosing position below the dosing unit 1 to shift the carrier 14 relative to the container 10. The driving mechanism of the piston/cylinder unit 16 may, for example, be hydraulic, pneumatic or hydro-pneumatic, wherein, of course, any different driving means, such as a linear driving mechanism or the like, may also be envisioned.

The closing mechanism 11 of the container 10 is configured, in a similar manner to that of the dosing unit 1, substantially in the form of a shiftable stamp which can be moved—in this case also vertically—between its (upper) closed position (FIGS. 1 to 4 and 8 to 11) and its (lower) opened position (FIGS. 5 to 7) by means of another piston/cylinder unit 17. The driving mechanism of the piston/cylinder unit 17 is configured in the same manner as that of the piston/cylinder units 5 and 16, wherein in particular a fluid spring may alternatively be provided which preloads the closing mechanism 11 of the container 10 into its closed position (FIGS. 1 to 4 and 8 to 11). In the embodiment shown, the cylinder of the piston/cylinder unit 17 is, for example, attached to rods 18—which are in this case stationary relative to the carrier 14 and fixed to it—so that the closing mechanism 11 can be shifted—in this case vertically—relative to the container 10 together with the carrier 14, while the closing mechanism 11 can in addition be moved between its opened and closed positions by shifting the piston rod of the piston/cylinder unit 17. Furthermore, the closing mechanism 11 of the container 10 can in particular be coupled with the closing mechanism 4 of the dosing unit 1, wherein the latter can be brought into contact with the exterior of the closing mechanism 11 from outside to dock the container 10 to the dosing unit 1, wherein the cross-sections of both closing mechanisms 4, 11 and/or the dosing outlet 3/receiving inlet 12 are preferably substantially congruent to avoid undercuts in the docked position, which could lead to undesired accumulation of bulk product.

Furthermore, a pressure compensation element may preferably be envisioned to compensate pressure between the interior of the dosing unit 1 and/or the container 10 and the surroundings, wherein in the present embodiment the elastic joining element 13 itself serves as a pressure compensation element at the same time by being made at least in part or entirely of filter material, for example in the form of filter tissue. The permeability of the filter tissue should be selected in such a way that even the smallest fraction of a particle contained in the bulk product to be dosed cannot pass through the filter material, so that the bulk product cannot come into contact with the surroundings. At the same time, the tight connection between dosing outlet 3 and receiving inlet 12 ensures that no gap or other leakage is formed through which the bulk product could come in contact with the surroundings.

The device described above may in particular be part of a facility for gravimetric combining of individual bulk product components from several reservoirs not shown in the drawings, each of which has one such dosing unit 1, such as the facility known, for example, from the above-mentioned DE 10 2005 014 930 A1. In this case, the container 10 serves as a mixing tank and travels between the reservoirs, for example along a guiding mechanism, wherein each of the reservoirs is equipped with a dosing unit. The container 10—or rather: each reservoir with a dosing unit 1—may then in particular be associated with a weighing device or scales (not shown in the drawings) on which the container 10 rests during the dosing process, in the course of which, according to the invention, force bypasses with the dosing unit 1 are avoided even when the container 10 is docked to the respective dosing unit 1. A control system may in this case serve to close the dosing outlet 3 and the receiving inlet 12, in particular together, as soon as the scales have gravimetrically detected and dosed the respective desired amount of bulk product.

A brief description of a method for substantially contamination-free transport of pourable bulk product from the dosing unit 1 into the container 10 will follow based on the various operating states of the device shown in FIGS. 1 to 11.

FIG. 1 shows both the closing mechanism 4 of the dosing outlet 3 of the dosing unit 1 and the closing mechanism 11 of the receiving inlet 12 of the container in their closed positions. The carrier 14 with the receiving inlet rests on the upper inlet 15 of the container 10. The container travels in the direction of arrow I to its dosing position disposed below the dosing unit 1, which it has finally reached in FIG. 2. The receiving inlet 12 is in alignment with the dosing outlet 3 in this representation.

Figure 3:
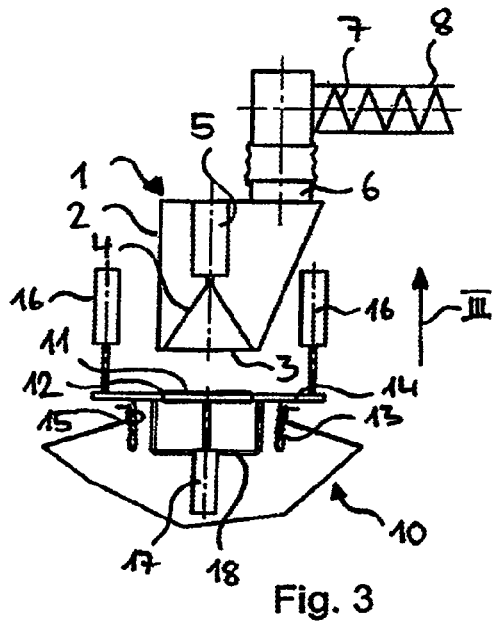
Figure 4:
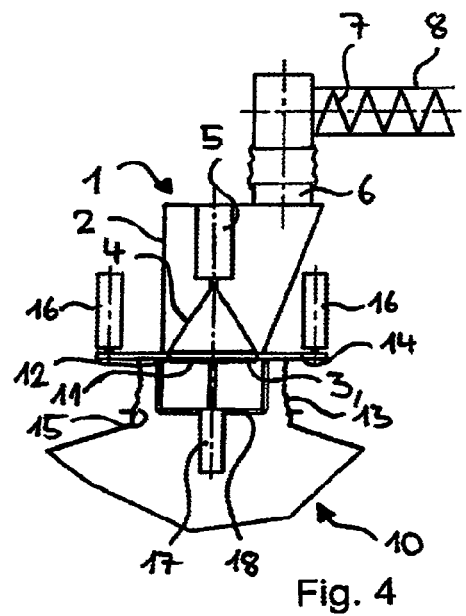

As is apparent from FIG. 3, the carrier 14 with the receiving inlet 12 of the container 10 is then grasped by expanding the pistons of the piston/cylinder units 16, which are, for example, fixed to the dosing unit 1, and lifted in the direction of arrow III by contraction of the pistons of these piston/cylinder units 16 to a level where the carrier 14 is connected with the upper inlet 15 of the container 10 only via the elastic joining element 13 (FIG. 4). The closing mechanism 4 of the dosing outlet 3 of the dosing unit 1 seats on the approximately congruent closing mechanism 11 of the receiving inlet 12 of the container 10; the dosing outlet 3 is connected with the receiving inlet 12. Consequently, the container 10 is docked to the dosing unit 1, wherein any force bypasses between the dosing unit 1 and the container 10 are avoided due to the elastic quality of the joining element 13.

Figure 5:
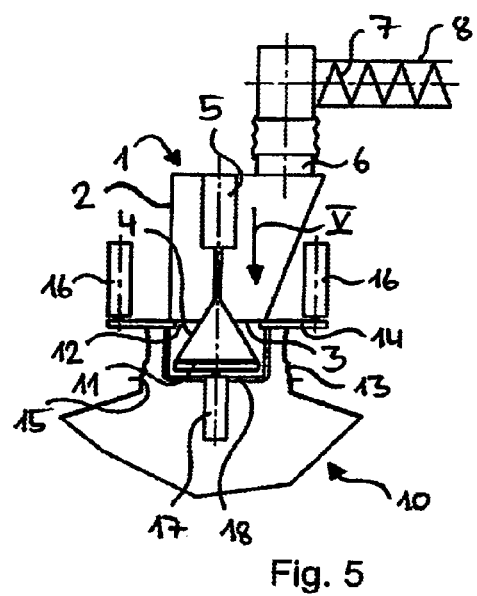
Figure 6:
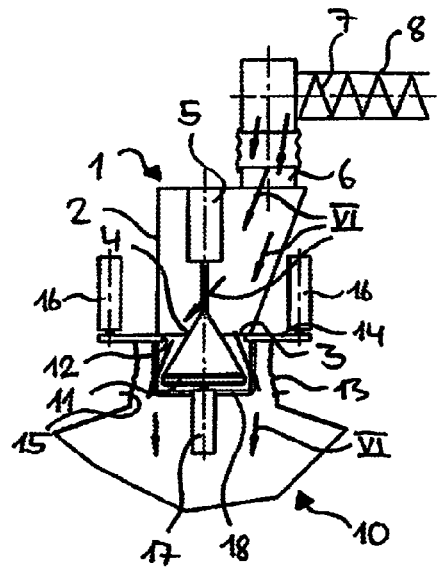
Figure 7:
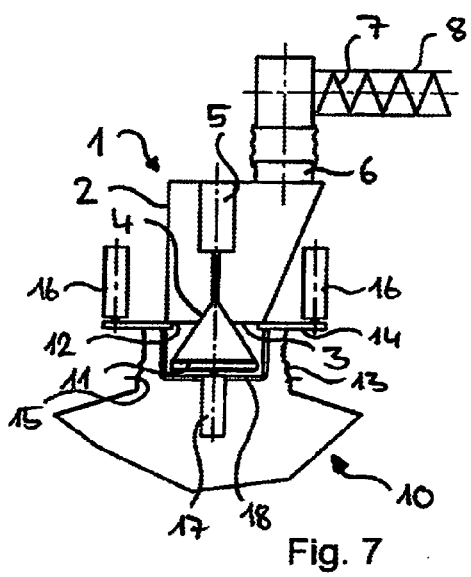
Figure 8:
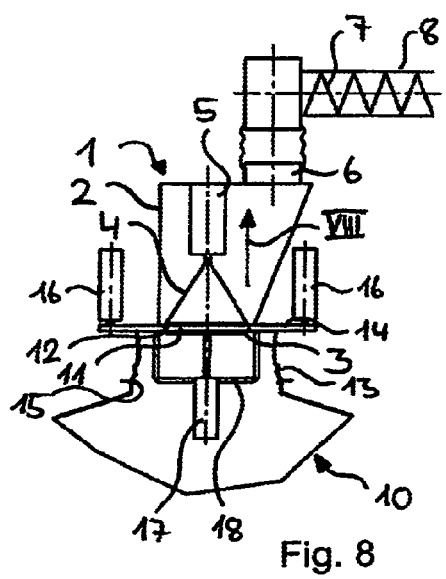

As can be seen in FIG. 5, the dosing outlet 3 is then opened together with the receiving inlet 12 by shifting the closing mechanisms 4, 11 coupled with each other from their (upper) closed position (FIG. 4) in the direction of arrow V into their (lower) opened position (FIG. 5). This can be done by means of a synchronized procedure of the piston/cylinder units 5, 17, wherein it may be particularly advantageous if one piston/cylinder unit—in this case the lower one 17 of the container 10—is formed by a fluid spring or any different, for example mechanical, spring preloaded in the direction of the closed position—in this case upwards—which is compressed against its preload by operating the piston/cylinder unit 5 to hold the closing mechanism 11 of the container 10 in contact with that 4 of the dosing unit 1. After having thus established a connection between the dosing unit 1 and the container 10, the worm conveyor 7 of the dosing unit 1 rotates, whereby the bulk product is transported from the dosing unit 1 into the container 10 as indicated by arrows VI in FIG. 6.

Once the scales associated with the container 10 have measured the desired amount of dosed bulk product, the conveyor spiral 7 is brought to a haft (FIG. 7) and the closing mechanisms 4, 11 are placed back in their (upper) closed position (FIG. 8) by operating the respective piston/cylinder unit 5, 17 in the direction of arrow VIII. In this respect, the situation shown in FIG. 8 corresponds to the one shown in FIG. 4.

Figure 9:
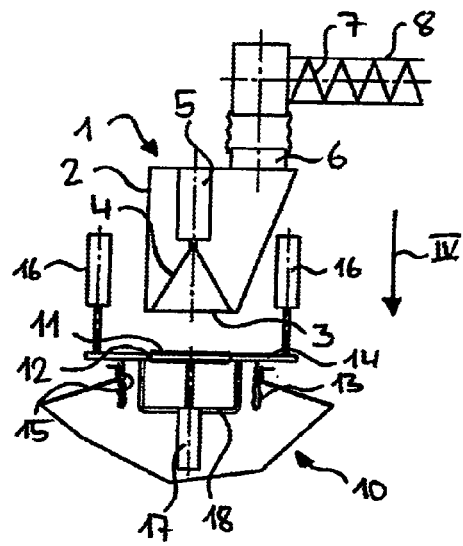
Figure 10:
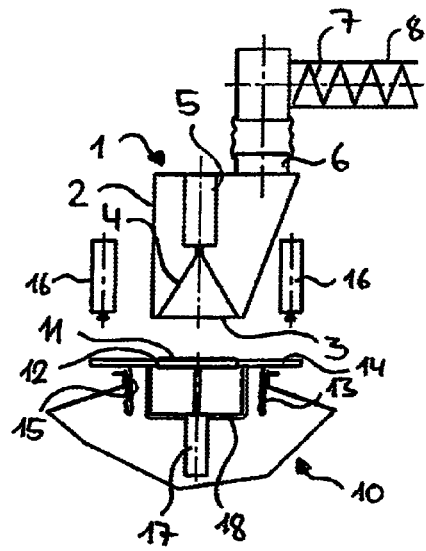

As can be seen in FIG. 9, the carrier 14 with the receiving inlet 12 is then shifted in the direction of arrow IX back into a position where it rests on the inlet 15 of the container 10 by means of the piston/cylinder units 16, whereupon the expanded pistons of these piston/cylinder units 16 release the carrier 14 and move back to a position where they are pulled in the cylinder (FIG. 10). Consequently, the container 10 is then entirely undocked from the dosing unit 1. In this respect, the situations shown in FIGS. 9 and 10 correspond to those shown in FIGS. 3 and 2.

Figure 11:
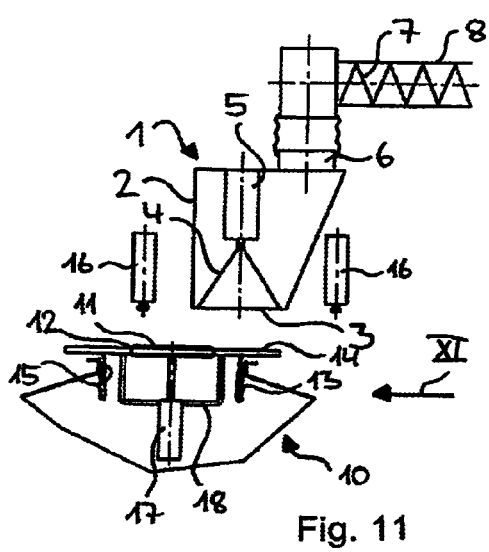

As is apparent from FIG. 11, the container 10 can then travel in the direction of arrow XI to the dosing unit (not shown) of the next reservoir or to an evacuation station, where the mixture of bulk products combined pursuant to the desired recipe is removed from the container 10 and transferred to further processing stations as needed, such as a station making product portions, a wrapping station, etc.

Figure 12C:
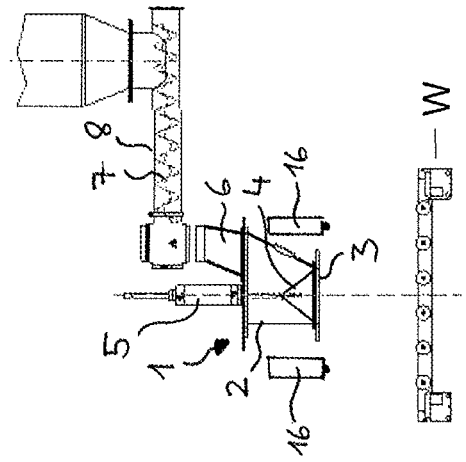
FIGS. 12a, 12b and 12c illustrate a device for gravimetric combining of individual bulk product components.
Figure 12B:
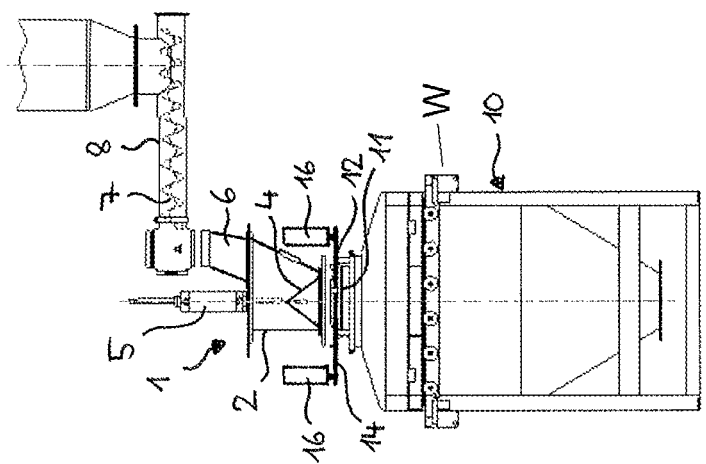
Figure 12A:
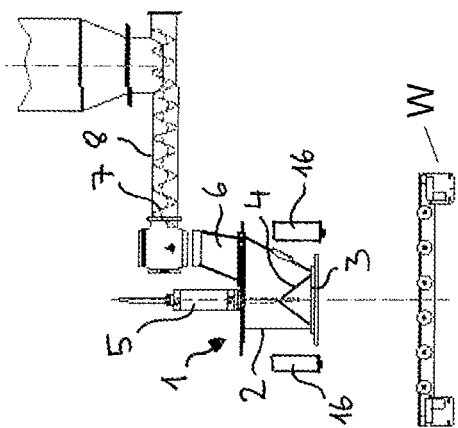

FIGS. 12a, 12b and 12c illustrate a device for substantially contamination-free, gravimetric combining of individual bulk product components from several reservoirs. The structures associated with the reference numbers have been previously described in connection with FIGS. 1 to 11. Each reservoir R has an associated dosing unit 1 with a dosing outlet 3, into a container 10 with a closable receiving inlet 12. Each of the reservoirs R has an associated weighing device W which cooperates with the container 10 at least while bulk product is being dosed from the respective reservoir R (see FIG. 12b). The container 10 travels below the dosing units 1 of the reservoirs R and can be sequentially connected, in a detachable manner, to the dosing unit 1 of the respective reservoir R according to the desired mixture ratio.

We claim:

1. A method for contamination-free transport of pourable bulk product from a dosing unit having a dosing outlet into a container having a receiving inlet, wherein the dosing outlet is opened and closed by a first closing mechanism and the receiving inlet is opened and closed by a second closing mechanism, the method comprising the steps of:
   a) directly connecting, in a detachable manner, the first closing mechanism to the second closing mechanism;
   b) simultaneously opening the first closing mechanism and the second closing mechanism; and
   c) transporting the bulk product from the dosing unit through the dosing outlet and through the receiving inlet into the container, wherein an elastic joining element is disposed between the second closing mechanism and the receiving inlet to prevent a transfer of forces between the dosing unit and the container during transport of the bulk product from the dosing unit to the container.

2. The method of claim 1, further comprising disposing the second closing mechanism on a carrier, shifting the carrier perpendicular to the receiving inlet, connecting the carrier to the container via the elastic joining element, aligning the carrier into a position relative to the container in which the carrier exclusively contacts the container via the elastic joining element and executing a dosing process.

3. The method of claim 2, further comprising creating pressure compensation during the dosing process between a surroundings and an interior of at least one of the dosing unit and the container.

4. The method of claim 3, wherein the pressure compensation is created by means of a filter element.

5. The method of claim 3, wherein the elastic joining element is at least partly made of filter material, the filter material creating pressure compensation.

6. The method of claim 1, further comprising weighing the container during a dosing process and closing the dosing outlet and the receiving inlet after dosing a desired, gravimetrically measured amount of bulk product.

7. A device for contamination-free transport of pourable bulk product, the device comprising:

a dosing unit having a dosing outlet;
a first closing mechanism communicating with said dosing unit for closing and opening said dosing outlet;
a container having a receiving inlet;
a second closing mechanism for closing and opening said receiving inlet;
an elastic joining element disposed between said second closing mechanism and said receiving inlet;
an element for directly connecting, in a detachable manner, said first closing mechanism to said second closing mechanism for simultaneous opening and closing of said dosing outlet and said receiving inlet;
an element for transporting the bulk product from said dosing unit through said dosing outlet and through said receiving inlet into said container, wherein said elastic joining element is disposed, structured and dimensioned to prevent a transfer of forces between said dosing unit and said container during transport of the bulk product from said dosing unit to said container.

8. The device of claim 7, wherein said second closing mechanism is disposed on a carrier, said carrier structured to shift perpendicular to said receiving inlet, said carrier being connected to said container via said elastic joining element, wherein, during a dosing procedure, said carrier exclusively contacts said container via said elastic joining element.

9. The device of claim 8, wherein said carrier rests on said container with said second closing mechanism connected to said container via said elastic joining element, said carrier structured for lifting thereof to a level where said carrier is exclusively in contact with said container via said elastic joining element.

10. The device of claim 7, wherein said first closing mechanism is disposed at said dosing unit in a rigid manner.

11. The device of claim 7, wherein said first and said second closing mechanisms are formed by stamps, said stamps structured for displacement perpendicular to said receiving inlet and said dosing outlet.

12. The device of claim 7, wherein said elastic joining element is a pressure compensation member configured to compensate pressure between a surroundings and an interior of at least one of said dosing unit and said container.

13. The device of claim 12, wherein said pressure compensation member is a filter element.

14. The device of claim 7, wherein said container has an associated weighing device.

15. The device of claim 14, further comprising a control system structured and disposed to close said first closing mechanism and said second closing mechanism after transporting an amount of presettable dosed bulk product which has been gravimetrically measured by means of said weighing device.

16. A facility for contamination-free, gravimetric combining of individual bulk product components, the facility comprising:
   at least two dosing units, each dosing unit having a dosing outlet;
   at least two first closing mechanisms, each of said first closing mechanisms communicating with one said dosing unit for closing and opening a respective said dosing outlet;
   a container having a receiving inlet;
   a second closing mechanism for closing and opening said receiving inlet;
   an elastic joining element disposed between said second closing mechanism and said receiving inlet;
   an element for directly connecting, in a detachable manner, one said first closing mechanism to said second closing mechanism for simultaneous opening and closing of a respective said dosing outlet and said receiving inlet;

at least two transport elements, each transport element disposed, structured and dimensioned to transport the bulk product from a respective said dosing unit through a respective said dosing outlet and through said receiving inlet into said container, wherein said elastic joining element is disposed, structured and dimensioned to prevent a transfer of forces between a respective said dosing unit and said container during transport of the bulk product from said respective dosing unit to said container;

at least two reservoirs, each reservoir cooperating with an associated said dosing unit; and at least one weighing device cooperating with said container when bulk product is being dosed from a respective reservoir, said container thereby structured for transport below said dosing units of said reservoirs and for sequential connection, in a detachable manner, to a respective said dosing unit of said respective reservoir in accordance with a desired mixture ratio.

* * * * *